(12) United States Patent
Kim

(10) Patent No.: US 12,326,602 B2
(45) Date of Patent: Jun. 10, 2025

(54) OPTICAL CONNECTOR SUPPORTING BIDIRECTIONAL COMMUNICATION

(71) Applicant: OPTICIS CO., LTD., Seongnam-si (KR)

(72) Inventor: Hee Dae Kim, Gwangju (KR)

(73) Assignee: OPTICIS CO., LTD., Seongnam-si (KR)

( * ) Notice: Subject to any disclaimer, the term of this patent is extended or adjusted under 35 U.S.C. 154(b) by 311 days.

(21) Appl. No.: 18/016,893

(22) PCT Filed: Jul. 23, 2021

(86) PCT No.: PCT/KR2021/009539
§ 371 (c)(1),
(2) Date: Jan. 19, 2023

(87) PCT Pub. No.: WO2022/019700
PCT Pub. Date: Jan. 27, 2022

(65) Prior Publication Data
US 2023/0288653 A1    Sep. 14, 2023

(30) Foreign Application Priority Data
Jul. 23, 2020  (KR) ......................... 10-2020-0091749

(51) Int. Cl.
*G02B 6/42*    (2006.01)
(52) U.S. Cl.
CPC ........... *G02B 6/4246* (2013.01); *G02B 6/423* (2013.01); *G02B 6/4244* (2013.01)
(58) Field of Classification Search
CPC .................................................. G02B 6/4246
See application file for complete search history.

(56) References Cited

U.S. PATENT DOCUMENTS 6,280,099 B1    8/2001    Wu
6,819,840 B2    11/2004   Tohgoh et al.
(Continued)

FOREIGN PATENT DOCUMENTS

CN    205157845 U  *  4/2016
EP    0 815 479 B1     1/1998
(Continued)

OTHER PUBLICATIONS

Japanese Office Action for App. No. 2023-501243, mailed Dec. 21, 2023 (12 pages).
(Continued)

*Primary Examiner* — Charlie Y Peng
(74) *Attorney, Agent, or Firm* — NIXON PEABODY LLP; Jeffrey L. Costellia

(57) ABSTRACT

Provided is an optical connector. The optical connector includes an optical sub-assembly (OSA) substrate integrally formed, the OSA substrate including a bottom surface, a first support surface, and a second support surface, the first and second support surfaces being formed together at a height of a first level from the bottom surface and apart from each other; a light-emitting device arranged on the first support surface; a ball lens located on a first optical path of light emitted from the light-emitting device, the ball lens being arranged on the second support surface; an optical fiber arranged at a rear portion of the ball lens along the first optical path; an optical filter configured to spatially separate the first optical path from the light-emitting device and a second optical path from the optical fiber; and a light-receiving device located on the second optical path and arranged on the second support surface.

22 Claims, 7 Drawing Sheets

(56) References Cited

U.S. PATENT DOCUMENTS

| | | |
|---|---|---|
| 7,486,846 B2 | 2/2009 | Warashina et al. |
| 7,520,682 B2 | 4/2009 | Eom et al. |
| 10,393,973 B2 | 8/2019 | Kim et al. |
| 11,409,060 B2 | 8/2022 | Kon |
| 2003/0123805 A1* | 7/2003 | Akashi ............... G02B 6/4266 385/49 |
| 2006/0239623 A1* | 10/2006 | Yoon ................. G02B 6/4246 385/89 |
| 2007/0273957 A1 | 11/2007 | Zalevsky et al. |
| 2007/0286549 A1 | 12/2007 | Warashina et al. |
| 2011/0044696 A1 | 2/2011 | Lim et al. |
| 2019/0033127 A1 | 1/2019 | Kim et al. |
| 2021/0311267 A1 | 10/2021 | Kim et al. |

FOREIGN PATENT DOCUMENTS

| | | | |
|---|---|---|---|
| EP | 0957379 | | 3/2005 |
| JP | H0560938 A | * | 3/1993 |
| JP | 2003-004992 A | | 1/2003 |
| JP | 2005-234052 A | | 9/2005 |
| JP | 2019-507374 A | | 3/2019 |
| JP | 2020-038250 A | | 3/2020 |
| KR | 10-2006-0024563 | | 3/2006 |
| KR | 10-1718481 | | 4/2017 |
| KR | 10-2017-0119479 | | 10/2017 |
| KR | 10-2019-0117118 | | 10/2019 |
| KR | 10-2004358 | | 10/2019 |
| TW | 1342962 B | * | 6/2011 |
| WO | WO-2005010588 A1 | * | 2/2005 ............. G01C 21/36 |

OTHER PUBLICATIONS

International Search Report for Application No. PCT/KR2021/009539, mailed Oct. 28, 2021 (6 pages).
Written Opinion for Application No. PCT/KR2021/009539, mailed Oct. 28, 2021 (4 pages).
Notice of Non-Final Rejection for Application No. 10-2020-0091749, mailed May 23, 2022 (6 pages).
Extended European Search Report in European Patent App. No. EP 21845910.5, dated Jun. 7, 2024 (9 pages).

\* cited by examiner

OPTICAL CONNECTOR SUPPORTING BIDIRECTIONAL COMMUNICATION

TECHNICAL FIELD

The disclosure relates to an optical connector. The current research has been performed as part of the "Regional Specialization Industrial Development Project (R&D, S2913806)" of the Ministry of Small and Medium-Sized Enterprises (SMEs) and Startups and the Korean Institute for Advancement of Technology.

BACKGROUND ART

An optical connector including a light-emitting device and an optical fiber as a communication cable, according to the related art, includes two or more heterogeneous platforms (optical sub-assemblies (OSAs)). In this optical connector formed based on the separate platforms, misalignment may frequently occur during a process of integrating different support bases for an alignment of optical components or of optically aligning each optical component.

In particular, with respect to bidirectional communication for bidirectional transmission and reception by using one communication cable, optical alignment of the optical connector having the plurality of different platforms may not be easy.

DISCLOSURE

Technical Problem

According to an embodiment of the disclosure, an optical connector having a simplified structure and adapted to be miniaturized by including one platform is provided.

According to another embodiment of the disclosure, an optical connector in which optical components are self-aligned is provided.

Technical Solution

To solve the problem described above and other problems, according to the disclosure, an optical connector includes: an optical sub-assembly (OSA) substrate integrally formed, the OSA substrate including a bottom surface, a first support surface, and a second support surface, the first and second support surfaces being formed together at a height of a first level from the bottom surface and apart from each other; a light-emitting device arranged on the first support surface; a ball lens located on a first optical path of light emitted from the light-emitting device, the ball lens being arranged on the second support surface; an optical fiber arranged at a rear portion of the ball lens along the first optical path; an optical filter configured to spatially separate the first optical path from the light-emitting device and a second optical path from the optical fiber; and a light-receiving device located on the second optical path and arranged on the second support surface.

For example, the first and second support surfaces and the bottom surface may respectively correspond to a surface side and another surface side of the OSA substrate that are opposite to each other.

For example, the first and second support surfaces and the bottom surface may respectively correspond to different flat surfaces of the OSA substrate.

For example, the light-emitting device may include a vertical cavity surface emitting laser diode (VCSEL).

For example, the VCSEL may have a relatively less input and output change according to a temperature than an edge emitting laser diode (EEL).

For example, the input and output change may indicate a degree of an output decrease of light power from an input of a same driving current, according to a temperature increase, or a degree of an input increase of a driving current for obtaining same light power, according to the temperature increase.

For example, a reflector may be arranged on the first support surface to cover the light-emitting device arranged on the first support surface.

For example, the reflector may be formed on an injection molding member arranged on the first support surface, wherein the reflector may be formed at an inner portion of the injection molding member facing the light-emitting device.

For example, light emitted from an upper surface of the light-emitting device may be irradiated by the reflector arranged to face the upper surface of the light-emitting device, toward a front side along the first optical path.

For example, the optical filter may be arranged on the first optical path and configured to transmit and provide, to the optical fiber, light of a first wavelength band incident from the light-emitting device, and may be arranged on the second optical path and configured to reflect and provide, to the light receiving device, light of a second wavelength band incident from the optical fiber.

For example, the light-emitting device and the optical fiber may be arranged on different sides of the optical filter from each other along the first optical path transmitted through the optical filter, and the optical fiber and the light receiving device may be arranged on a same side of the optical filter along the second optical path reflected by the optical filter.

For example, a groove configured to support the optical filter may be formed between the first and second support surfaces.

For example, the optical filter may be supported to be inclined toward the second support surface between the first support surface and the second support surface at both sides of the groove.

For example, the light receiving device may be arranged on the second support surface adjacent to the optical filter.

For example, the groove may include: a base surface having a step difference toward the bottom surface between the first and second support surfaces; and a pair of first side walls connecting between the first support surface and the base surface and between the second support surface and the base station.

For example, the base surface may be formed at a height of a second level from the bottom surface, wherein the second level may be lower than the first level with respect to the first and second support surfaces.

For example, the optical filter may be obliquely supported through a first support point formed on the base surface and a second support point formed at an edge at which the first side wall and the second support surface contact each other.

For example, the optical filter may obliquely extend across the light receiving device and may be obliquely supported through, along with the first and second support points, a third support point formed at an edge of the light receiving device.

For example, the light receiving device may be arranged at a lower portion of the optical filter.

For example, the ball lens may be aligned by an alignment guide formed on the second support surface to surround the ball lens.

For example, the ball lens may be configured to focus the light from the light-emitting device along the first optical path toward a front end of the optical fiber or to form light from the optical fiber along the second optical path as parallel rays.

For example, the ball lens may be configured to focus the light emitted from the light-emitting device along the first optical path and formed as parallel rays by a drum lens toward the front end of the optical fiber, or to form diffusion light emitted from the optical fiber along the second optical path as parallel rays.

Advantageous Effects

According to the disclosure, a platform (an optical sub-assembly (OSA)) of an optical connector is formed as a single integral structure, and thus, the optical connector may have a simplified structure and may be miniaturized. For example, both of optical components, such as a reflector, a drum lens, an optical filter, a ball lens, etc., along a first optical path from a light-emitting device, and optical components, such as a ball lens, an optical filter, etc. along a second optical path from an optical fiber, may be mounted on an OSA substrate, and thus, alignment of the light-emitting device, the optical fiber, and the optical components between the light-emitting device and the optical fiber may be automatically performed, based on the single OSA substrate.

Also, according to the disclosure, the optical filter and the ball lens may be optically aligned with each other respectively through a groove formed in the OSA substrate to have a predetermined depth and an alignment guide formed on the OSA substrate.

BEST MODE

An optical connector according to the disclosure includes: an optical sub-assembly (OSA) substrate integrally formed, the OSA substrate including a bottom surface, a first support surface, and a second support surface, the first and second support surfaces being formed together at a height of a first level from the bottom surface and apart from each other; a light-emitting device arranged on the first support surface; a ball lens located on a first optical path of light emitted from the light-emitting device, the ball lens being arranged on the second support surface; an optical fiber arranged at a rear portion of the ball lens along the first optical path; an optical filter configured to spatially separate the first optical path from the light-emitting device and a second optical path from the optical fiber; and a light-receiving device located on the second optical path and arranged on the second support surface.

MODE FOR INVENTION

Hereinafter, an optical connector according to a desired embodiment of the disclosure will be described, with reference to the accompanying drawings.

Figure 1:
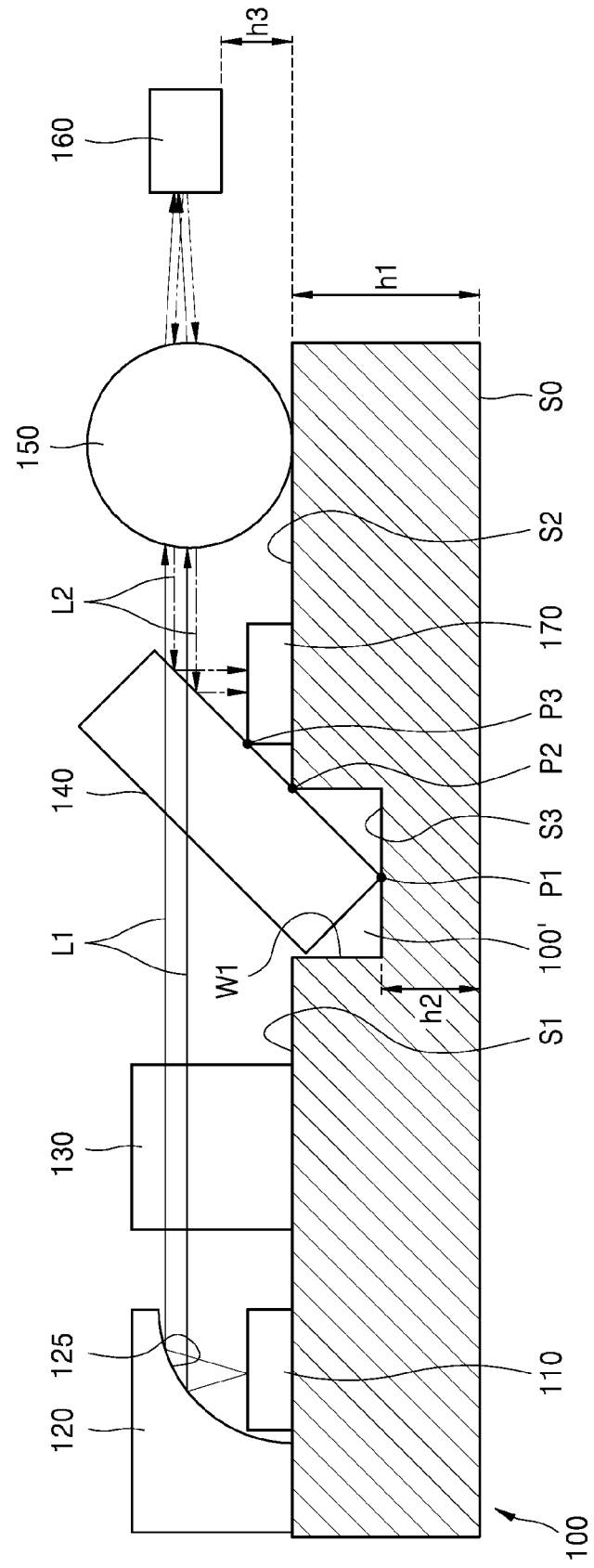
FIGS. 1 and 2 illustrate different diagrams of an optical connector according to an embodiment of the disclosure.
Figure 2:
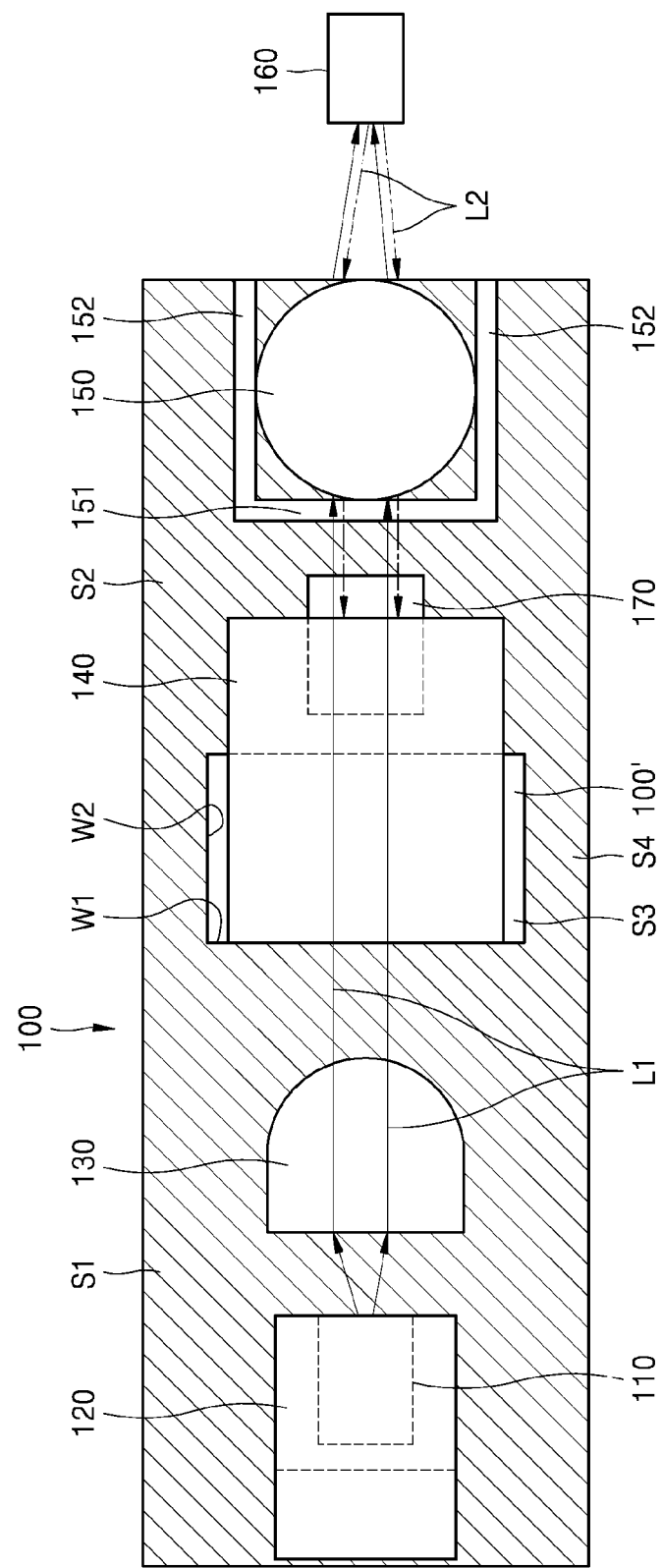

FIGS. 1 and 2 illustrate different diagrams of an optical connector according to an embodiment of the disclosure.

Referring to the drawings, the optical connector may include: an optical sub-assembly (OSA) substrate 100 integrally formed and including a bottom surface S0 and a first support surface S1 and a second support surface S2, the first and second support surfaces S1 and S2 being formed together at a first level height h1 from the bottom surface S0 and being apart from each other; a light-emitting device 110 arranged on the first support surface S1; a ball lens 150 arranged on the second support surface S2, the ball lens 150 being located on a first optical path L1 of light emitted from the light-emitting device 110; an optical fiber 160 arranged at a rear portion of the ball lens 150 along the first optical path L1; an optical filter 140 for spatially separating the first optical path L1 from the light-emitting device 110 and a second optical path L2 from the optical fiber 160; and a light receiving device 170 located on the second optical path L2 and arranged on the second support surface S2.

The optical connector according to an embodiment of the disclosure may support bidirectional communication in which optical signals of a first wavelength band λ1 and a second wavelength band λ2 that are different from each other may be transmitted and received through one optical fiber 160. For example, the optical connector may form a transmitting end with respect to the optical signal of the first wavelength band λ1 and, at the same time, may form a receiving end with respect to the optical signal of the second wavelength band λ2 different from the first wavelength band λ1. As described below, the optical signals of the first and second wavelength bands λ1 and λ2 different from each other may progress along the first and second optical paths L1 and L2 spatially separated from each other through the optical filter 140.

The optical connector may include the OSA substrate 100 configured to provide locations for mounting the optical components and automatically align the optical components. The OSA substrate 100 may be integrally formed. Accordingly, the optical components may be mounted on right locations configured on the OSA substrate 100, and the optical components may be self-aligned.

The OSA substrate 100 may include the bottom surface S0 and the first and second support surfaces S1 and S2 formed together at the first level height h1 from the bottom surface S0 to be apart from each other. As described below, a groove 100' in which the optical filter 140 is mounted may be formed between the first and second support surfaces S1 and S2. That is, the first and second support surfaces S1 and S2 may be formed to be disconnected to be apart from each other with the groove 100' therebetween. According to an embodiment of the disclosure, the first and second support surfaces S1 and S2 and the bottom surface S0 may respectively correspond to a surface side and the other side of the OSA substrate 100 that are opposite to each other. Also, the first and second support surfaces S1 and S2 and the bottom surface S0 may correspond to flat surfaces of the OSA substrate 100. According to an embodiment of the disclosure, the light-emitting device 110 may be arranged on the first support surface S1, and the ball lens 150 may be arranged on the second support surface S2.

According to an embodiment of the disclosure, the light-emitting device 110 may be a vertical cavity surface emitting laser diode (VCSEL) operating in the first wavelength band $\lambda 1$. According to an embodiment of the disclosure, the VCSEL, as the light-emitting device 110, may be appropriate for lower power consumption and short-range communication (for example, a communication range of 300 m) and may support a multi-mode providing outputs of different wavelength bands. Unlike the VCSEL implemented in an embodiment of the disclosure, an edge emitting laser diode (EEL) implemented in a comparative embodiment of the disclosure may be appropriate for high power consumption and long-range communication (for example, a communication range of 10 km) and may support a single mode providing an output of a single wavelength band.

Figure 3:
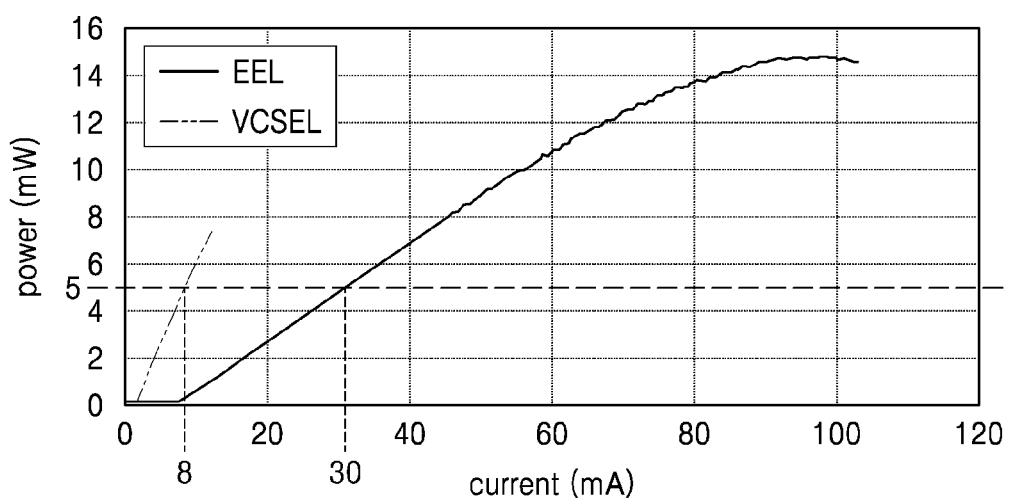
FIG. 3 illustrates a diagram showing a change in light power according to an injection current of a light-emitting device, in each of a vertical cavity surface emitting laser diode (VCSEL) applied according to an embodiment of the disclosure and an edge emitting laser diode (EEL) applied according to a comparative embodiment of the disclosure.
Figure 4:
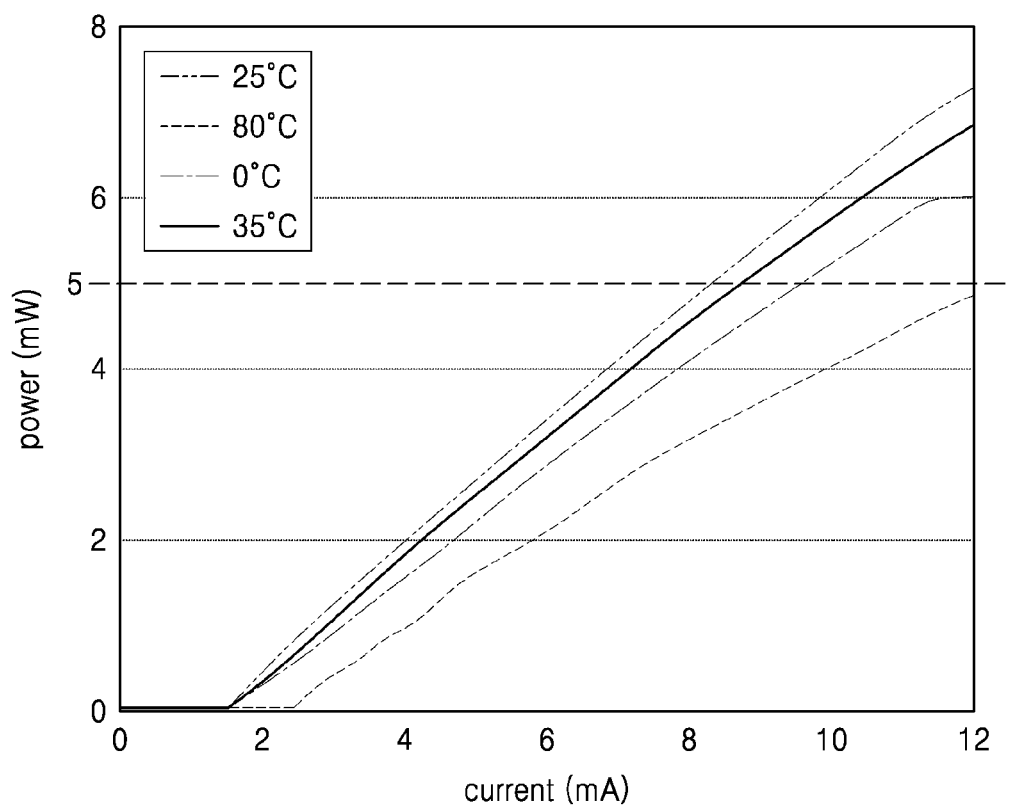
FIG. 4 illustrates a diagram showing a change in light power with respect to an injection current according to different temperatures in a VCSEL.
Figure 5:
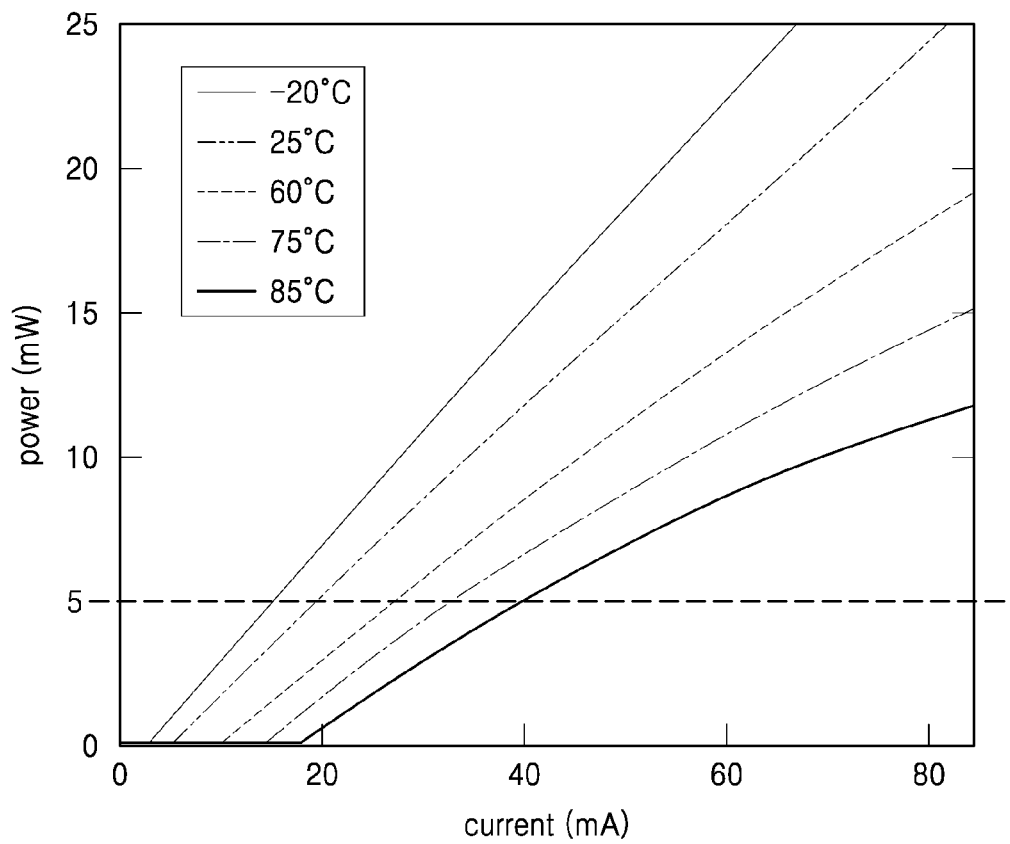
FIG. 5 illustrates a diagram showing a change in light power with respect to an injection current according to different temperatures in an EEL.

FIG. 3 illustrates a diagram showing a change in light power according to an injection current of a light-emitting device, in each of the VCSEL applied according to an embodiment of the disclosure and the EEL applied according to a comparative embodiment of the disclosure. FIG. 4 illustrates a diagram showing a change in light power with respect to an injection current according to different temperatures in the VCSEL, and FIG. 5 illustrates a diagram showing a change in light power with respect to an injection current according to different temperatures in the EEL.

Referring to FIG. 3, in order to obtain an output of the same light power, for example, the same light power of 5 mW, an injection current of about 8 mA is required in the VCSEL. However, a higher driving current is required in the EEL than in the VCSEL, that is, an injection current of about 30 mA is required. As described above, for the output of the same light power, an input of a higher driving current is required in the EEL than in the VCSEL, and as the input of the driving current is increased, a heating amount is increased. Here, to compare FIGS. 4 and 5, in the VCSEL, with respect to a change of an input and an output according to a temperature change, a driving current, the input required for the output of the same light power (e.g., 5 mW), is not significantly affected by a temperature. However, in the EEL, the driving current, the input required for the output of the same light power (e.g., 5 mW), is greatly affected by the temperature. That is, in the EEL in which the driving current and a heating state based on the driving current have relatively high levels, the output of the light power based on the input of the same driving current is decreased according to a rise of the temperature, and thus, as the temperature rises, it is required to increase the input of the driving current to obtain the output of the same light power.

As described above, in the EEL, the input and output relationship (for example, a relationship between the input of the driving current and the output of the light power) is greatly affected by the heating state. Therefore, according to the comparative embodiment of the disclosure in which the EEL is implemented, a feedback component may need to be included in order to constantly maintain the light power regardless of a heating state of the light-emitting device 110, wherein the feedback component may be configured to detect the light power from a portion of an output of the light-emitting device 110 and control, based on the detected light power, an injection current. For example, according to the comparative embodiment of the disclosure in which the EEL is implemented, a partial reflector (not shown) configured to transmit most of the output of the light-emitting device 110 but reflect a portion of the output of the light-emitting device 110 toward a detection device (not shown) may be included, and an integrated circuit (IC) (not shown) configured to control the injection current of the light-emitting device 110 by feeding back the light power measured by the detection device (not shown) may be included. According to the comparative embodiment of the disclosure, the partial reflector (not shown) configured to change the optical path from the light-emitting device 110 and the detection device (not shown) configured to detect the light power may be added. Thus, the overall structure of an optical connector may become complex. In particular, the partial reflector (not shown) configured to change the optical path from the light-emitting device 110 or the detection device (not shown) configured to detect the light power on the optical path passing by the partial reflector (not shown) may have to be aligned at a precise location adjacent to the light-emitting device 110, for example, on the optical path of the light-emitting device 110, and thus, a precise alignment process is required in a manufacturing process, and a strict processing management is demanded.

In the optical connector according to an embodiment of the disclosure, the VCSEL having a relatively low driving current and a relatively low heating state based thereon and having an input and output relationship (for example, the relationship between an input of the driving current and an output of the light power) relatively little affected by the heating state, may be applied as the light-emitting device 110. Thus, monitoring with respect to the light-emitting device 110 via a feedback component may not be required. Also, as illustrated in FIG. 4, the VCSEL, as the light-emitting device 110, may have a relatively little change in an input and output curve (a curve between the driving current and the output of the light power) according to a heating state or a temperature change, and thus, even without configuring the feedback component for the monitoring, through a modulation configuration to switch the light power between high and low levels according to high and low levels of the injection current in order to convert an electrical input signal (corresponding to the injection current) into an optical output signal (corresponding to the light power), the proper modulation performance may be maintained.

The VCSEL, as the light-emitting device 110, according to an embodiment of the disclosure, may support a multi-mode for providing an output of various wavelength bands. The EEL, as the light-emitting device 110, according to the comparative embodiment of the disclosure, may be appropriately driven for a single mode for providing an output of one wavelength band. According to an embodiment of the disclosure, by applying, as the light-emitting device 110, the VCSEL, which may be appropriately driven for the multi-mode, transmission in the multi-mode with respect to optical signals of various wavelength bands may be smoothly performed according to a combination with the ball lens 150 appropriate for the multi-mode.

Referring to FIGS. 1 and 2, a reflector 125 may be arranged on the first optical path L1 from the light-emitting device 110. The reflector 125 may be arranged on the first support surface S1 on which the light-emitting device 110 is arranged, to cover the light-emitting device 110, and may be formed on a portion of an injection molding member 120. In more detail, the reflector 125 may be formed on a portion of the injection molding member 120 which is molded according to coagulation of melting resins (not shown) injected in a mold (not shown). Also, the injection molding member 120 on which the reflector 125 is formed may be arranged on the first support surface S1 on which the light-emitting device 110 is arranged, to cover the light-emitting device 110, and the reflector 125 may be formed on an inner portion of the injection molding member 120, the inner portion of the injection molding member 120 facing the light-emitting device 110. For example, the reflector 125 may be formed as an ellipsoid mirror, and the reflector 125 may be aligned such that an emission area of the light-emitting device 110 is arranged on a focal point of the ellipsoid mirror 125. For example, the ellipsoid mirror 125 may irradiate light from the light-emitting device 110 toward a front side and may irradiate light diffused from the light-emitting device 110 toward the front side by converting the light into a form of light diverged or emitted in an axial direction. According to an embodiment of the disclosure, the light-emitting device 110 may be provided as a VCSEL emitting light in a direction perpendicular to an upper surface of the light-emitting device 110, and the light emitted in the direction perpendicular to the upper surface of the light-emitting device 110 may be irradiated by the ellipsoid mirror 125 toward the front side.

According to an embodiment of the disclosure, the light-emitting device 110 may be arranged on the first support surface S1, and the ball lens 150 may be arranged on the second support surface S2. That is, the ball lens 150 may be located on the first optical path L1 from the light-emitting device 110 and may be arranged on the second support surface S2.

The ball lens 150 may be arranged on the first optical path L1 from the light-emitting device 110 and the second optical path L2 from the optical fiber 160, and the center of the ball lens 150 may be aligned on an optical axis of the first optical path L1 from the light-emitting device 110 and an optical axis of the second optical path L2 from the optical fiber 160. According to an embodiment of the disclosure, the ball lens 150 may focus the light from the light-emitting device 110 along the first optical path L1 toward a front end of the optical fiber 160 or may form the light from the optical fiber 160 along the second optical path L2 as parallel rays. Also, the optical filter 140 may be arranged between the light-emitting device 110 and the optical fiber 160 to spatially separate the first optical path L1 from the light-emitting device 110 and the second optical path L2 from the optical fiber 160 from each other.

According to an embodiment of the disclosure, the ball lens 150 may focus light emitted from the light-emitting device 110 along the first optical path L1 and formed by the drum lens 130 as parallel rays, toward the front end of the optical fiber 160 or may form diffused light emitted from the optical fiber 160 along the second optical path L2 as parallel rays. To this end, the ball lens 150 may be formed as a spherical transparent member.

The optical connector according to an embodiment of the disclosure may support bi-directional communication allowing transmission and reception of optical signals of the first and second wavelength bands λ1 and λ2 different from each other via one optical fiber 160, and the ball lens 150 may focus the optical signal of the first wavelength band λ1 from the optical filter 140 along the first optical path L1 so as to form a light spot of a diameter of about 30 μm to 40 μm in order to focus the optical signal on a core 161 (see FIG. 6A) of the optical fiber 160, that is, the core 161 of a diameter of 50 μm (or a diameter of 62.5 μm) in the optical fiber 160 for a multi-mode according to an embodiment of the disclosure, and may form the optical signal of the second wavelength band λ2 from the core 161 of the diameter of 50 μm (or the diameter of 62.5 μm) along the second optical path L2 into a form of parallel rays and provide the parallel rays to the optical filter 140. For example, the ball lens 150 according to an embodiment of the disclosure may provide appropriate refractive indices with respect to the optical signals of the different wavelength bands λ1 and λ2 in order to focus the optical signals of the different wavelength bands λ1 and λ2 on the core 161 of the diameter of 50 μm (or the diameter of 62.5 μm).

According to a comparative embodiment of the disclosure, an aspherical lens, rather than the ball lens 150, may be applied. For example, the aspherical lens implemented in the comparative embodiment of the disclosure may form a light spot (e.g., a light spot of a diameter of 10 μm) focused on a relatively narrow area, unlike the general ball lens 150 applicable according to the disclosure. However, the aspherical lens requires special processing and precise optical alignment, and thus, manufacturing costs may be increased.

According to an embodiment of the disclosure, an VCSEL appropriate for a multi-mode may be implemented as the light-emitting device 110, and thus, even when the general ball lens 150 is implemented, sufficient coupling with the optical fiber 160 for the multi-mode having the core 161 of the relatively great diameter of 50 μm (or the diameter of 62.5 μm) may be possible. According to a comparative embodiment of the disclosure, an EEL appropriate for a single mode may be implemented, and thus, only when an aspherical lens is implemented, sufficient coupling with an optical fiber 160' for the single mode having a core 161' of a relatively small diameter of 8 μm to 12 μm may become possible. For example, it is needed to form a relatively narrow light spot (for example, a light spot of a diameter of 10 μm) by implementing the aspherical lens. According to the comparative embodiment in which the EEL appropriate for the single mode is implemented, when the general ball lens 150 is implemented according to the disclosure, a relatively wide light spot (for example, a light spot of a diameter of 30 μm to 40 μm) may be formed through the ball lens 150, and thus, an optical signal may not be sufficiently focused on the optical fiber 160' for the single mode having the core 161' of the relatively small diameter of 8 μm to 12 μm, and optical loss may be increased. Thus, it is not appropriate for transmission of the optical signal.

Referring to FIG. 2, alignment guides 151 and 152 for aligning the ball lens 150 may be formed around the ball lens 150. The alignment guides 151 and 152 may be formed to surround the ball lens 150 and may be formed on the second support surface S2 on which the ball lens 150 is arranged, to surround the ball lens 150. For example, the alignment guides 151 and 152 may include a main partition wall 151 extending across the first and second optical paths L1 and L2 and a pair of side partition walls 152 extending in parallel with the first and second optical paths L1 and L2 at both sides of the main partition wall 151.

The ball lens 150 may be arranged on the second support surface S2 which is flat, and according to an embodiment of the disclosure, the ball lens 150 may be bonded on the flat second support surface S2 to have a fixed location. For example, the ball lens 150 may include spherical borosilicate glass, and an adhesive (not shown) may include an epoxy-based material, an acryl-based material, etc. According to an embodiment of the disclosure, the ball lens 150 may have a fixed location on the flat second support surface S2 via an adhesive (not shown), etc., and an additional groove for mounting the ball lens 150 may not be formed in the second support surface S2. However, according to an embodiment of the disclosure, the ball lens 150 may be aligned by the alignment guides 151 and 152 formed to surround the ball lens 150 and may have a fixed location via assembling with respect to the alignment guides 151 and 152, without using an additional adhesive (not shown).

Referring to FIG. 1, the groove 100' dented to have a predetermined depth from the first and second support surfaces S1 and S2 may be formed between the first and second support surfaces S1 and S2 forming a surface of the OSA substrate 100. The optical filter 140 may be inserted into the groove 100'. The optical filter 140 may include a plurality of dielectric thin films stacked on a glass substrate or a plastic substrate. The optical filter 140 may be a high-pass or low-pass edge filter. Also, according to various embodiments of the disclosure, the optical filter 140 may be a band pass filter having a predetermined pass band.

According to an embodiment of the disclosure, the optical filter 140 may transmit light of the first wavelength band $\lambda 1$ and reflect light of the second wavelength band $\lambda 2$. However, the optical filter 140 is not limited to the example described above and may be modified to have various structures. The optical filter 140 may be formed as transflective layers of various types selectively reflecting/transmitting the optical signals of the different wavelength bands $\lambda 1$ and $\lambda 2$ to separate the optical signals of the different wavelength bands $\lambda 1$ and $\lambda 2$. Also, the optical filter 140 may not be limited to a name or a form and may also be referred to as other names, such as a beam splitter or a dichroic mirror.

The optical filter 140 may be configured to spatially separate the first optical path L1 from the light-emitting device 110 and the second optical path L2 from the optical fiber 160 from each other and may be distinguished from a device configured to separate light from the same light source according to different wavelength bands or polarization components. Here, that the optical filter 140 spatially separates the first optical path L1 from the light-emitting device 110 and the second optical path L2 from the optical fiber 160 from each other denotes that the first optical path L1 connecting the light-emitting device 110 with the optical fiber 160 and the second optical path L2 connecting the optical fiber 160 with the light receiving device 170 are spatially separated to follow different paths and does not denote that light from the same light source is separated to follow different paths according to wavelength bands or polarization components.

The optical filter 140 may be arranged on the first optical path L1 and configured to transmit and provide, to the optical fiber 160, the light of the first wavelength band $\lambda 1$ that is incident from the light-emitting device 110 and may be arranged on the second optical path L2 and configured to reflect and provide, to the light receiving device 170, the light of the second wavelength band $\lambda 2$ that is incident from the optical fiber 160. The light receiving device 170 may sense the output light of the optical fiber 160, the output light being reflected by the optical filter 140, and output an optical signal into an electrical signal. For example, the optical filter 140 may separate and provide, to the first and second optical paths L1 and L2 different from each other, the optical signals of the first and second wavelength bands $\lambda 1$ and $\lambda 2$ different from each other, thereby supporting bi-directional communication.

In a relationship with the optical filter 140, the light-emitting device 110 and the optical fiber 160 may be arranged on different sides of the optical filter 140 along the first optical path L1 transmitted through the optical filter 140, and the optical fiber 160 and the light receiving device 170 may be arranged on the same side of the optical filter 140 along the second optical path L2 reflected by the optical filter 140.

The optical filter 140 may be supported by a shape of the groove 100', and the optical filter 140 supported by the shape of the groove 100' may be obliquely arranged to be inclined toward the light receiving device 170 arranged on the second support surface S2. That is, the optical filter 140 may be supported to have a shape inclined toward the second support surface S2 between the first and second support surfaces S1 and S2 formed at both sides of the groove 100' by which the optical filter 140 is supported. Throughout the specification, that the optical filter 140 is supported by the shape of the groove 100' may denote that the optical filter 140 is supported by two or more different surfaces included in the groove 100'. According to an embodiment of the disclosure, the groove 100' may be formed to have an approximately square cross-sectional shape by including a base surface S3 having a step difference in a downward direction toward the bottom surface S0 from the first and second support surfaces S1 and S2, and a first side wall W1 extending upwardly from the base surface S3 and connected with the first and second support surfaces S1 and S2. According to an embodiment of the disclosure, the optical filter 140 may be supported by a first support point P1 formed on the base surface S3 of the groove 100' and holding up an edge of the optical filter 140 and a second support point P2 formed on an edge at which the first side wall W1 of the groove 100' and the second support surface S2 contact each other and holding up a main surface of the optical filter 140. Also, the optical filter 140 may be supported by the first and second support points P1 and P2 of the groove 100' and may extend across the light receiving device 170 arranged on the second support surface S2. Also, the optical filter 140 may be supported by a third support point P3 formed on an edge of the light receiving device 170 and holding up the main surface of the optical filter 140. As described above, the optical filter 140 may be generally supported by the first to third support points P1 to P3, wherein the optical filter 140 may be obliquely supported by the first and second support points P1 and P2 formed in the groove 100' and the third support point P3 formed on the light receiving device 170.

According to an embodiment of the disclosure, the OSA substrate 100 may include the first and second support surfaces S1 and S2 formed together at the first level height h1 from the bottom surface S0 and a third support surface S3 (corresponding to the base surface S3 of the groove 100') formed at a second level height h2 which is lower than the first level height h1 from the bottom surface S0. Here, the third support surface S3 may correspond to the base surface S3 of the groove 100' having the step difference in the downward direction toward the bottom surface S0 from the first and second support surfaces S1 and S2 and may be formed at the second level height h2 from the bottom surface S0. As described above, the OSA substrate 100 according to an embodiment of the disclosure may generally include the first and second level heights h1 and h2 different from each other, and surfaces of both of the first and second level heights h1 and h2 different from each other, that is, both the first and second support surfaces S1 and S2 formed at the first level height h1 and the third support surface S3 formed at the second level height h2 may be formed by an one-time etching operation. By forming the OSA substrate 100 through an one-time etching operation, the manufacturing process may become simple.

Referring to FIG. 2, the groove 100' into which the optical filter 140 is inserted may include a pair of first side walls W1 extending across the first and second optical paths L1 and L2 and a pair of second side walls W2 extending in parallel with the first and second optical paths L1 and L2. Also, because the groove 100' may be formed to have a shape surrounded by the pairs of first and second side walls W1 and W2 surrounding the base surface S3, the groove 100' may perform the function of the alignment guides for aligning the optical filter 140. According to an embodiment of the disclosure, the groove 100' may be formed between the first and second support surfaces S1 and S2, and the first and second support surfaces S1 and S2 may be separated from each other by the groove 100'. According to an embodiment of the disclosure, as the first and second support surfaces S1 and S2 may be separated from each other by the groove 100', the first and second support surfaces S1 and S2 may be connected with each other through a fourth support surface S4 formed at both sides of the groove 100', that is, formed at the outside of the second side wall W2. Here, the first and second support surfaces S1 and S2 and the fourth support surface S4 at both sides of the groove 100', the fourth support surface S4 connecting the first and second support surfaces S1 and S2 with each other, may be formed together at the same first level height h1.

Referring to FIG. 1, the drum lens 130 may be arranged on the first optical path L1 between the light-emitting device 110 and the optical filter 140. The drum lens 130 may include a surface formed as a spherical surface or an aspherical surface, and another surface formed as a flat surface and may form light irradiated from the reflector as diffused light into a form of parallel rays and provide the parallel rays to the optical filter 140.

The optical fiber 160 may be arranged at a level apart from the second support surface S2 on which the ball lens 150 is arranged. In more detail, the optical fiber 160 may be arranged at a third level height h3 from the second support surface S2. That is, the optical fiber 160 may be arranged at a height matching with a height additionally adding the third level height h3 to the first level height h1 (corresponding to the height of the second support surface S2) from the bottom surface S0 of the OSA substrate 100.

According to an embodiment of the disclosure, the optical fiber 160 maybe arranged at the third level height h3 from the second support surface S2 on which the ball lens 150 is arranged, such that the optical axis of the second optical path L2 from the optical fiber 160 and the center of the ball lens 150 are aligned with each other. According to an embodiment of the disclosure, the optical fiber 160 may be arranged at an outer portion of the OSA substrate 100.

Figure 6A:
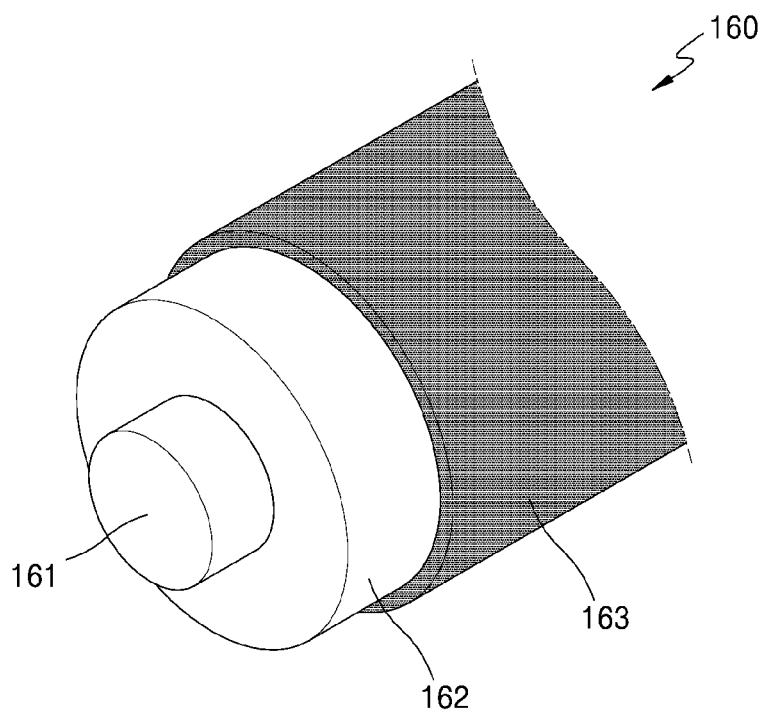
FIG. 6A illustrates a diagram showing a sectional structure of an optical fiber for a multi-mode, as an optical fiber according to an embodiment of the disclosure.
Figure 6B:
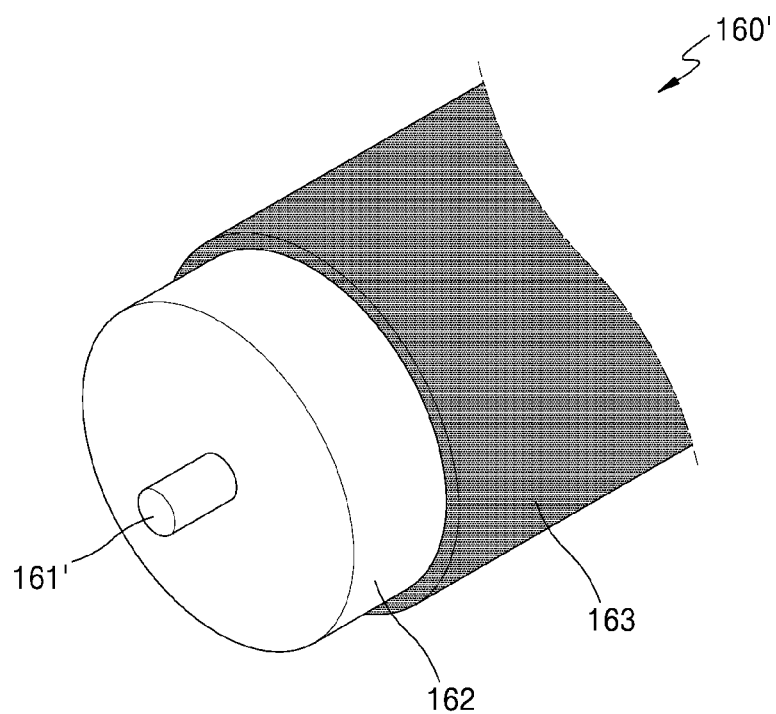
FIG. 6B illustrates a diagram showing a sectional structure of an optical fiber for a single mode, which may be implemented in a comparative embodiment of the disclosure.

According to an embodiment of the disclosure, as the optical fiber 160, a multi-mode optical fiber 160 supporting a multi-mode for allowing transmission of signals of various wavelength bands may be implemented. The optical connector according to an embodiment of the disclosure may support bidirectional communication allowing transmission and reception of optical signals of the first wavelength band λ1 and the second wavelength band λ2 different from each other via one optical fiber 160, and thus, as the optical fiber 160, the multi-mode optical fiber 160 may be implemented. As illustrated in FIG. 6A, the multi-mode optical fiber 160, as the optical fiber 160 according to an embodiment of the disclosure, may include the core 161 corresponding to a transmission path of an optical signal, cladding 162 surrounding an outer circumference of the core 161, and a jacket 163 surrounding an outer circumference of the cladding 162, wherein the core 161 may have a diameter of about 50 μm to 62.5 μm, and as illustrated in FIG. 6B, according to a comparative embodiment of the disclosure, in a single-mode optical fiber 160', a core 161' may have a diameter of about 8 μm to 12 μm.

While the disclosure is described with reference to the embodiments illustrated in the accompanying drawings, it is only an example, and one of ordinary skill in the art may understand that various modifications and other equivalent embodiments may be possible from the disclosure.

INDUSTRIAL APPLICABILITY

The disclosure relates to an optical connector and may be applied in electronic devices and communication devices applying optical communication.

The invention claimed is:

1. An optical connector comprising:
an optical sub-assembly (OSA) substrate integrally formed, the OSA substrate comprising a bottom surface, a first support surface, and a second support surface, the first and second support surfaces being formed together at a height of a first level from the bottom surface and apart from each other;
a light-emitting device arranged on the first support surface;
a ball lens located on a first optical path of light emitted from the light-emitting device, the ball lens being arranged on the second support surface;
an optical fiber arranged at a rear portion of the ball lens along the first optical path;
an optical filter configured to spatially separate the first optical path from the light-emitting device and a second optical path from the optical fiber; and
a light-receiving device located on the second optical path and arranged on the second support surface.

2. The optical connector of claim 1, wherein the first and second support surfaces and the bottom surface respectively correspond to a surface side and another surface side of the OSA substrate that are opposite to each other.

3. The optical connector of claim 1, wherein the first and second support surfaces and the bottom surface respectively correspond to different flat surfaces of the OSA substrate.

4. The optical connector of claim 1, wherein the light-emitting device comprises a vertical cavity surface emitting laser diode (VCSEL).

5. The optical connector of claim 4, wherein the VCSEL has a relatively less input and output change according to a temperature than an edge emitting laser diode (EEL).

6. The optical connector of claim 5, wherein the input and output change indicates a degree of an output decrease of light power from an input of a same driving current, according to a temperature increase, or a degree of an input increase of a driving current for obtaining same light power, according to the temperature increase.

7. The optical connector of claim 1, wherein a reflector is arranged on the first support surface to cover the light-emitting device arranged on the first support surface.

8. The optical connector of claim 7, wherein the reflector is formed on an injection molding member arranged on the first support surface, wherein the reflector is formed at an inner portion of the injection molding member facing the light-emitting device.

9. The optical connector of claim 7, wherein light emitted from an upper surface of the light-emitting device is irradiated by the reflector arranged to face the upper surface of the light-emitting device toward a front side along the first optical path.

10. The optical connector of claim 1, wherein the optical filter is arranged on the first optical path and configured to transmit and provide, to the optical fiber, light of a first wavelength band incident from the light-emitting device, and is arranged on the second optical path and configured to reflect and provide, to the light receiving device, light of a second wavelength band incident from the optical fiber.

11. The optical connector of claim 1, wherein the light-emitting device and the optical fiber are arranged on different sides of the optical filter from each other along the first optical path transmitted through the optical filter, and
the optical fiber and the light receiving device are arranged on a same side of the optical filter along the second optical path reflected by the optical filter.

12. The optical connector of claim 1, wherein a groove configured to support the optical filter is formed between the first and second support surfaces.

13. The optical connector of claim 12, wherein the optical filter is supported to be inclined toward the second support surface between the first support surface and the second support surface at both sides of the groove.

14. The optical connector of claim 13, wherein the light receiving device is arranged on the second support surface adjacent to the optical filter.

15. The optical connector of claim 12, wherein the groove comprises:
a base surface having a step difference toward the bottom surface between the first and second support surfaces; and
a pair of first side walls connecting between the first support surface and the base surface and between the second support surface and the base station.

16. The optical connector of claim 15, wherein the base surface is formed at a height of a second level from the bottom surface,
wherein the second level is lower than the first level of the first and second support surfaces.

17. The optical connector of claim 15, wherein the optical filter is obliquely supported through a first support point formed on the base surface and a second support point formed at an edge at which the first side wall and the second support surface contact each other.

18. The optical connector of claim 17, wherein the optical filter obliquely extends across the light receiving device and is obliquely supported through, along with the first and second support points, a third support point formed at an edge of the light receiving device.

19. The optical connector of claim 18, wherein the light receiving device is arranged at a lower portion of the optical filter.

20. The optical connector of claim 1, wherein the ball lens is aligned by an alignment guide formed on the second support surface to surround the ball lens.

21. The optical connector of claim 1, wherein the ball lens is configured to focus the light from the light-emitting device along the first optical path toward a front end of the optical fiber or to form light from the optical fiber along the second optical path as parallel rays.

22. The optical connector of claim 21, wherein the ball lens is configured to focus the light emitted from the light-emitting device along the first optical path and formed as parallel rays by a drum lens toward the front end of the optical fiber, or to form diffusion light emitted from the optical fiber along the second optical path as parallel rays.

* * * * *